US005904379A

United States Patent [19]

Chang

[11] Patent Number: 5,904,379

[45] Date of Patent: May 18, 1999

[54] ROTATION JOINT FOR FACIAL STEAMER ARM

[76] Inventor: Henry Ping Chang, 2345 Ridgeway Rd., San Marino, Calif. 91108

[21] Appl. No.: 09/128,591

[22] Filed: Aug. 3, 1998

[51] Int. Cl.$^{6}$ .................................................. F16L 27/08

[52] U.S. Cl. ............................ 285/61; 285/184; 285/272; 285/282

[58] Field of Search .................................... 285/282, 272, 285/275, 184, 61

[56] References Cited

U.S. PATENT DOCUMENTS

| | | | |
|---|---|---|---|
| 2,587,938 | 3/1952 | Warren | 285/184 |
| 3,319,982 | 5/1967 | Schwartz | 285/184 X |
| 4,026,586 | 5/1977 | Kennedy, Jr. et al. | 285/61 X |

*Primary Examiner*—Lynne A. Reichard
*Assistant Examiner*—John R. Cottingham
*Attorney, Agent, or Firm*—David & Raymond; Raymond Y. Chan

[57] ABSTRACT

A rotation joint which is adapted for connecting a steamer arm to a facial steamer machine includes a clamping mount affixed to the facial steamer machine, an arm head which is affixed to the steamer arm having a head sleeve rotatably mounted in the clamping mount, a stopper device for limiting the rotation angle of the steamer arm, and a locking means for fastening the steamer arm to a desired inclined angle. The rotation joint limits the adjustable rotation angle of the facial steamer arm to less than 180 degree, so that the steamer arm is blocked to avoid positioning horizontally. In other words, in all situation during operation, the steamer arm extends upwards to prevent any hot water from dropping down to the patient body. Besides, the rotation joint also enables the steamer arm to be adjusted to a hang down position so as to save the storage space when it is not in use.

20 Claims, 5 Drawing Sheets

ROTATION JOINT FOR FACIAL STEAMER ARM

FIELD OF THE PRESENT INVENTION

The present invention relates to a facial steamer, and more particularly to a rotation joint for facial steamer arm that not only permits the facial steamer arm to normally rotate and set in any desired position within a predetermined angle, but also enables the facial steamer arm turning to hang down position when it is not used.

BACKGROUND OF THE PRESENT INVENTION

A first generation facial steamer simply comprises a steamer machine and a steamer arm rigidly extended from the steamer machine. A far end of the steamer arm provides a steam outlet opening for spreading out steam at a fixed angle that can not be adjusted to other desirable position.

A second generation facial steamer, as shown in FIG. 1, has been improved over the first generation facial steamer, in which a steamer arm 201 is reconstructed to rotatably attached on a side of a steamer machine 200, so that the steamer arm 201 is able to be adjusted with certain rotating angle. Even though the second generation facial steamer provides some improvement over the first generation facial steamer, it still contains shortcomings described as follows:

1. Hot water may be generated along with the steam. However, there is no mechanism provided for controlling the rotating angle of the steamer arm 201 of the second generation facial steamer, so that the steamer arm 201 has a risk of being positioned horizontally or inclined downwardly. The hot water may drop down to the patient's body to cause scald.

2. The patient usually is required to la) on an operation bed while the cosmetician sits or stands at an end side of the operation bed in order to work on the patient's face. Normally, the facial steamer is designed for right-handed user and placing at a right hand side of the operation bed for easy reaching the control panel 203 by his or her right hand. However, if the cosmetician is a left-handed user, the cosmetician would face a great inconvenience during operation. Sometimes, the space and arrangement in the operation room is limited that the facial steamer must only be placed at the left side of the operation bed, the same problem may also happen to the right-handed user.

3. The inclined position of the steamer arm of the conventional facial steamer is generally held by means of friction. Unwanted movement will happen to the steamer arm during the operation.

4. The steamer arm of all the conventional facial steamer is always extended outwardly from the facial steamer machine, that occurs plenty of space even during moving from place to place or when the facial steamer is not in use.

5. The operating direction and angle of the steamer arm of the conventional facial steamer is limited, so that one conventional facial steamer normally can only work on a single patient. For example, if the facial steamer is designed for left-handed user, the user has to move the whole facial steamer from one operation bed to the left hand side of another operation bed for anther operation.

SUMMARY OF THE PRESENT INVENTION

It is thus a first object of the present invention to provide a rotation joint for facial steamer arm, which limits the adjustable rotation angle of the facial steamer arm to less than 180 degree, so that the steamer arm is blocked to avoid positioning horizontally. In other words, in all situation during operation, the steamer arm extends upwards to prevent any hot water from dropping down to the patient body.

A further object of the present invention is to provide a rotation joint for facial steamer arm, wherein the steamer arm can be selectively to rotate to a left or a right position, so that it can be placed both in the right side and the left side of the operation bed so as to meet the requirement of either the right-handed user or the left-handed user and to fit the operation room of any size and arrangement.

Yet another object of the present invention is to provide a rotation joint for facial steamer arm, wherein the inclined angle of the steamer arm can be firmly locked in position to avoid unwanted movement after it is set.

Still another object of the present invention is to provide a rotation joint for facial steamer arm, which enables the steamer arm turning to a hang down position so as to save the storage space during transportation or when it is not in use.

Still another object of the present invention is to provide a rotation joint for facial steamer arm, which enables the facial steamer to be placed between two operation beds, wherein the user may selectively operate the steamer arm to work on the left or right operation bed without moving the facial steamer.

Accordingly, in order to accomplish the above objects, the present invention provides a rotation joint adapted for connecting a steamer arm to a facial steamer machine, which comprises a clamping mount, an arm head, a stopper device, and a locking means.

The clamping mount, which is affixed to a back side of the facial steamer machine having a steam outlet, has a circular mounting hole coaxially aligned with the steam outlet. The mounting hole has an open slot. The clamping mount further comprises a pair of parallel clamp fins integrally extended from two sides of the open slot, wherein when the two clamp fins are pressed toward each other, a diameter of the mounting hole is reduced.

The arm head, which is connected to a connecting end of the steamer arm, comprises a head sleeve having an outer diameter slightly smaller than the diameter of the mounting hole. The head sleeve has an enlarged end forming a shoulder rim for affixing to the cylindrical connecting end of the steamer arm. The head sleeve is rotatably mounted inside the mounting hole of the clamping mount. A steam supplying tube, which is extended along the steamer arm, is connected to the steam outlet of the facial steamer machine. An arc-shape restricting groove is formed on an upper portion of the shoulder rim of the head sleeve, wherein an interior angle between two ends of the restricting groove must be less than 180 degree.

The stopper device comprises a blocking stud protruded from a front side of the clamping mount. A front end of the blocking stud is extended in the restricting groove, so that the blocking stud limits the rotation angle of the steamer arm. Therefore, the right rotation angle of the steamer arm is limited when the left end of the restricting groove is blocked by the blocking stud. Similarly, the left rotation angle of the steamer arm is limited when the right end of the restricting groove is stopped by the blocking stud.

The stopper device further comprises an elastic element. The blocking stud has an enlarged head. The clamping mount further has a stopper hole extended from a front side to a rear side of the clamping mount. A diameter of a front end of the stopper hole reduces to slightly larger than the blocking stud while the residual portion of the stopper hole has a diameter slightly larger than the enlarged head of the blocking stud, so that the blocking stud is inserted inside the stopper hole. The elastic element is also inserted into the stopper hole to press against the blocking stud. A holder is secured to a rear end of the stopper hole so as to hold the elastic element and the blocking stud inside the stopper hole. Therefore, the blocking stud is able to be pressed inwardly until its front end leaves the restricting groove of the shoulder rim of the head sleeve. Then, the blocking of the head sleeve by the blocking stud is released and the steamer arm is free to rotate downwardly until it is hanged down.

The locking means is adapted for pressing the two clamp fins toward each other in order to firmly clamp the head sleeve in the mounting hole of the clamping mount, so that the steamer arm is fastened in position to prevent any rotation movement.

DETAILED DESCRIPTION OF THE PREFERRED EMBODIMENT

Figure 1:
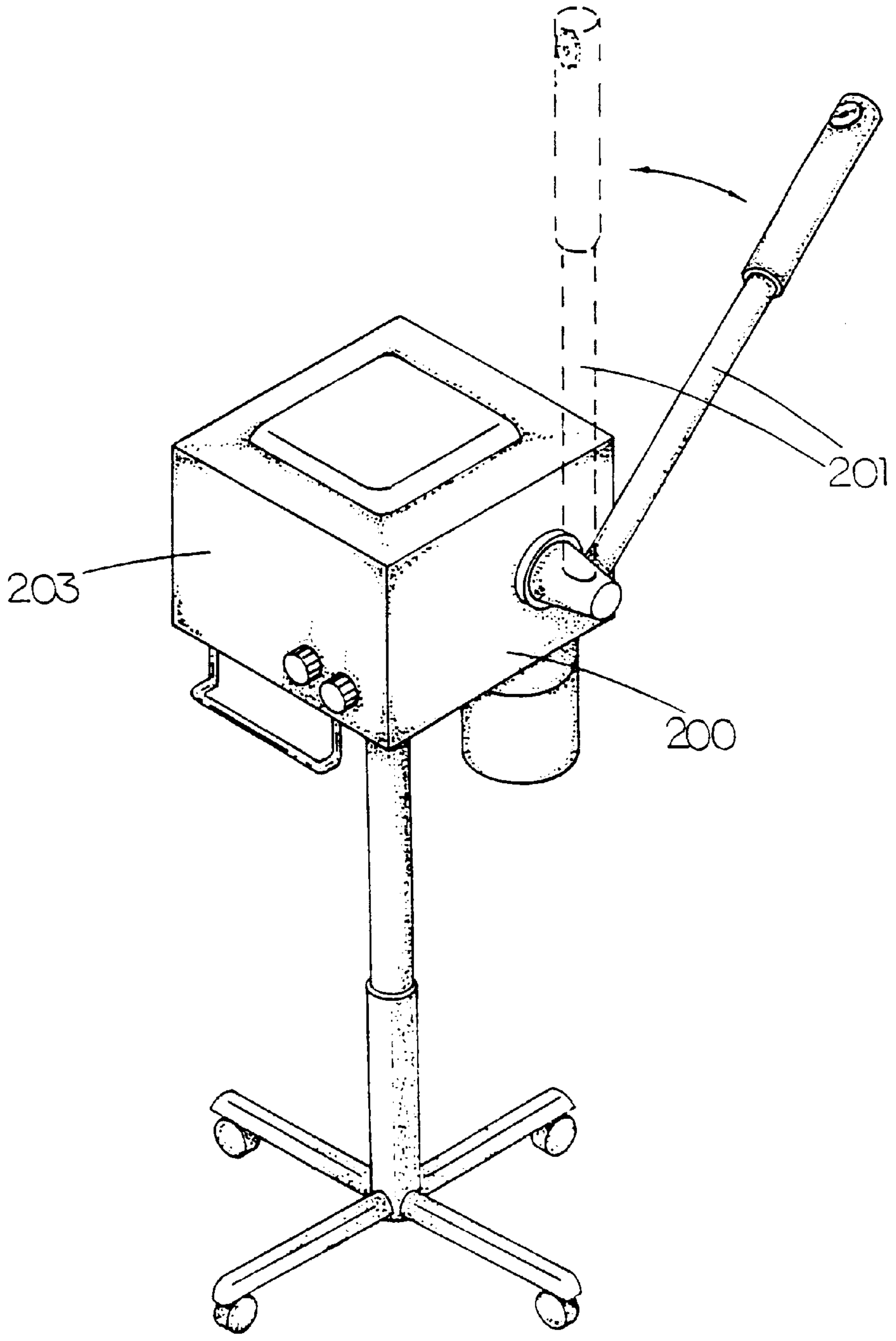
PRIOR ART FIG. 1
FIG. 1 is a perspective of a conventional facial steamer.

Referring to FIGS. 1 to 5, a rotation joint 10 for facial steamer arm according to a first preferred embodiment of the present invention is illustrated. The rotation joint 10 is adapted for connecting a steamer arm 70 to a facial steamer machine 80 which has a front control panel 801 and a steam outlet 81 provided at a back side thereof The rotation joint 10 comprises a clamping mount 30, an arm head 40, a stopper device 50, and a locking means 60.

Figure 2:
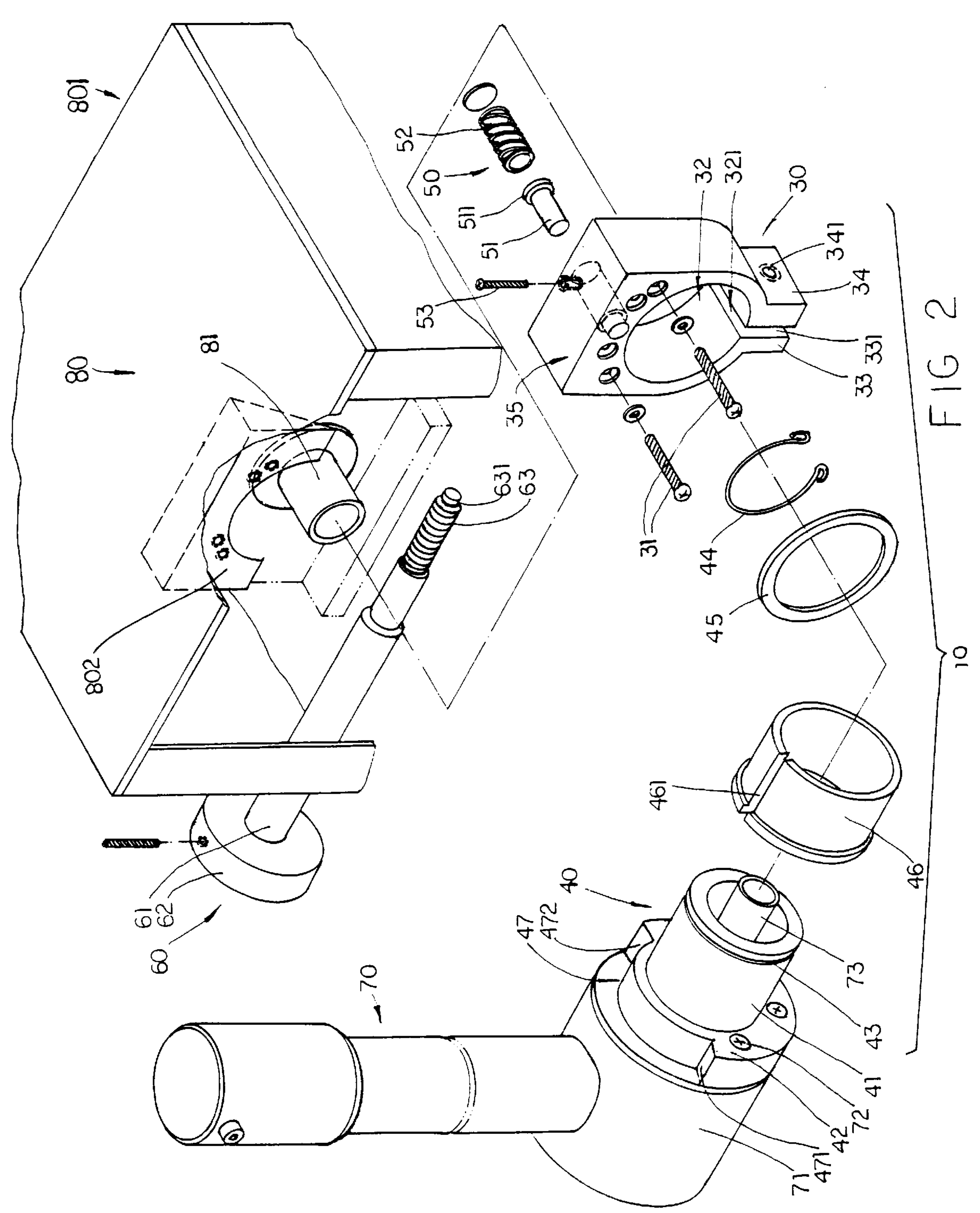
FIG. 2 is an exploded partial perspective view of a rotation joint according to a preferred embodiment of the present invention.

The clamping mount 30, which is preferably made of aluminum alloy, is affixed to a back side of the facial steamer machine 80 by a plurality of screws 31. The clamping mount 30 has a circular mounting hole 32 coaxially aligned with the steam outlet 81. The mounting hole 32 has an open slot 321, as shown in FIG. 2. The clamping mount 30 further comprises a pair of parallel clamp fins 33, 34 integrally extended from two sides of the open slot 321, wherein when the two clamp fins 33, 34 are pressed toward each other, a diameter of the mounting hole 32 is reduced.

The arm head 40 is connected to a connecting end 71 of the cylindrical steamer arm 70. The arm head 40 comprises a head sleeve 41 having an outer diameter slightly smaller than the diameter of the mounting hole 32 and a length longer than a thickness of the clamp hole 32. The head sleeve 41 has an enlarged end forming a shoulder rim 42 which is affixed to the cylindrical connecting end 71 of the steamer arm 70 by a plurality of screws 72.

Figure 3:
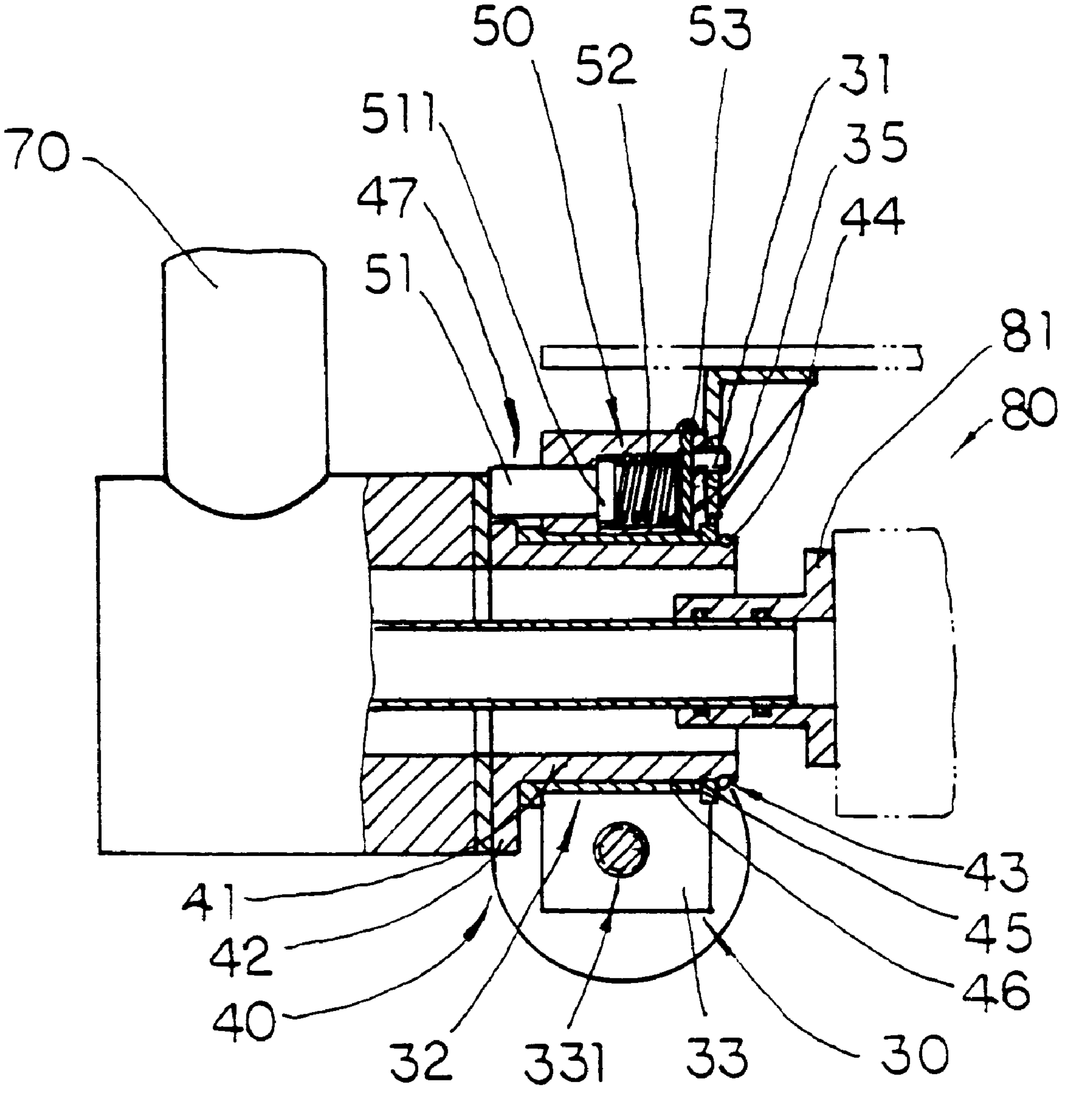
FIG. 3 is a partial sectional view of the rotation joint according to the above preferred embodiment of the present invention.

As shown in FIGS. 2 and 3, the head sleeve 41 is rotatably mounted inside the mounting hole 32 of the clamping mount 30. A ring groove 43 is provided near a free end of the head sleeve 41, wherein when the head sleeve 41 is inserted through the mounting hole 32, a C-ring 44 is mounted on the ring groove 43 so as to rotatably combine the head sleeve 41 with the clamping mount 30. The C-ring 44 can substantially lock the head sleeve 41 in position and prevent the head sleeve 41 from withdrawing from clamp mount 30. A washer ring 45 made of plastic or silicon is mounted between the C-ring 44 and a rear side of the clamping mount 30 so as to ensure smooth contact therebetween. A steam supplying tube 73, which is extended along the steamer arm 70, is connected to the steam outlet 81 of the facial steamer machine 80.

The head sleeve 41 further comprises a sleeve 46 mounted thereon, which has a longitudinal slot 461 and is made of plastic or silicon. The sleeve 46 is positioned between the clamping mount 30 and the head sleeve 41 to ensure smooth rotation of the head sleeve 41 with respect to the mounting hole 32 by reducing friction therebetween.

An arc-shape restricting groove 47 is formed on an upper portion of the shoulder rim 42 of the head sleeve 40, wherein an interior angle between two ends 471, 472 of the restricting groove 47 must be less than 180 degree. According to the present embodiment, the restricting groove 47 is a curved cut along the periphery of the shoulder rim 42, as shown in FIG. 2.

Figure 5A:
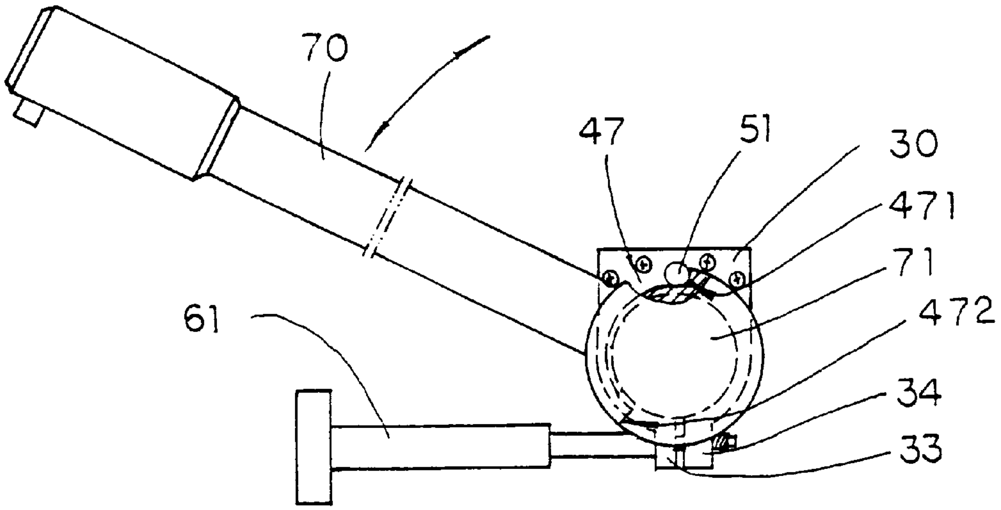
FIGS. 5A and 5B are the partial front views of the rotation joint according to the above preferred embodiment, illustrating the limited rotation angle of the steamer arm.

The stopper device 50 comprises a blocking stud 51 protruded from a front side of the clamping mount 30. A front end of the blocking stud 51 is extended in the restricting groove 47, so that the rotation of the steamer arm 70 is limited by the blocking stud 51. Therefore, as shown in FIG. 5A, the left rotation angle of the steamer arm 70 is limited when the right end 471 of the restricting groove 47 is stopped by the blocking stud 51. Accordingly, the facial steamer machine 80 is adapted to place at a right side of the operation bed.

Figure 5B:
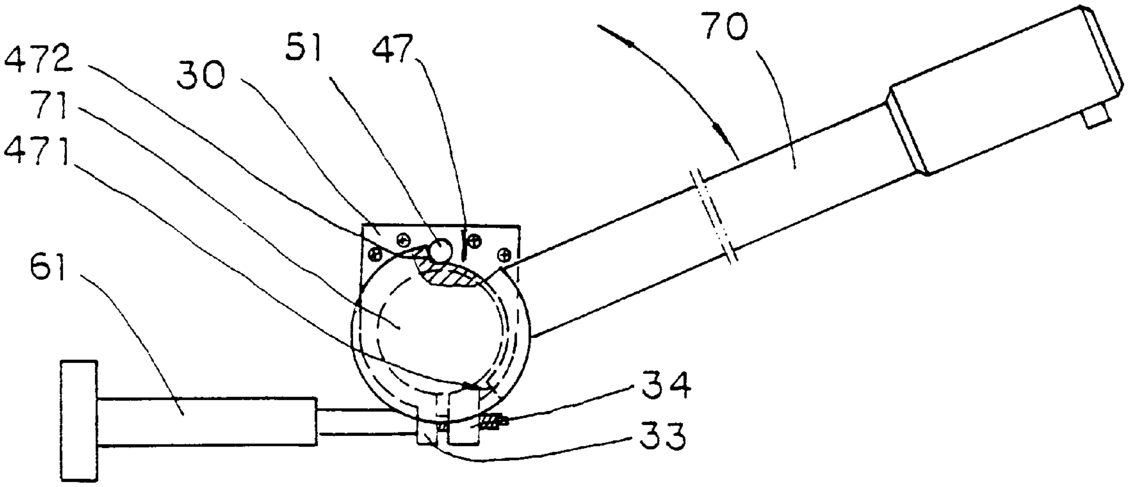

Similarly, the right rotation angle of the steamer arm 70 is limited when the left end 472 of the restricting groove 47 is stopped by the blocking stud 51, as shown in FIG. 5B. Therefore, the facial steamer machine 80 is also allowed to place at a left side of the operation bed.

Due to the presence of the stopper device 50 of the present invention, the lowest position of the steamer arm 70 is inclined above the horizontal, so that even though hot water may generated with the steam, the hot water will flow downwards along the steamer arm 70 back to the facial steamer machine 80 and thus no hot water will be dropped down from the steamer arm 70.

As shown in FIGS. 2 and 3, the stopper device 50 further comprises an elastic element 52 that is a spring. The blocking stud 51 has an enlarged head 511. Besides, the clamping mount 30 further has a stopper hole 35 extended from a front side to a rear side of the clamping mount 30. A diameter of a front end of the stopper hole 35 reduces to slightly larger than the blocking stud 51 while the residual portion of the stopper hole 35 has a diameter slightly larger than the enlarged head 511 of the blocking stud 51, so that the blocking stud 51 can be inserted inside the stopper hole 35. The elastic element 52 is also inserted into the stopper hole 35 to press against the blocking stud 51.

Figure 4:
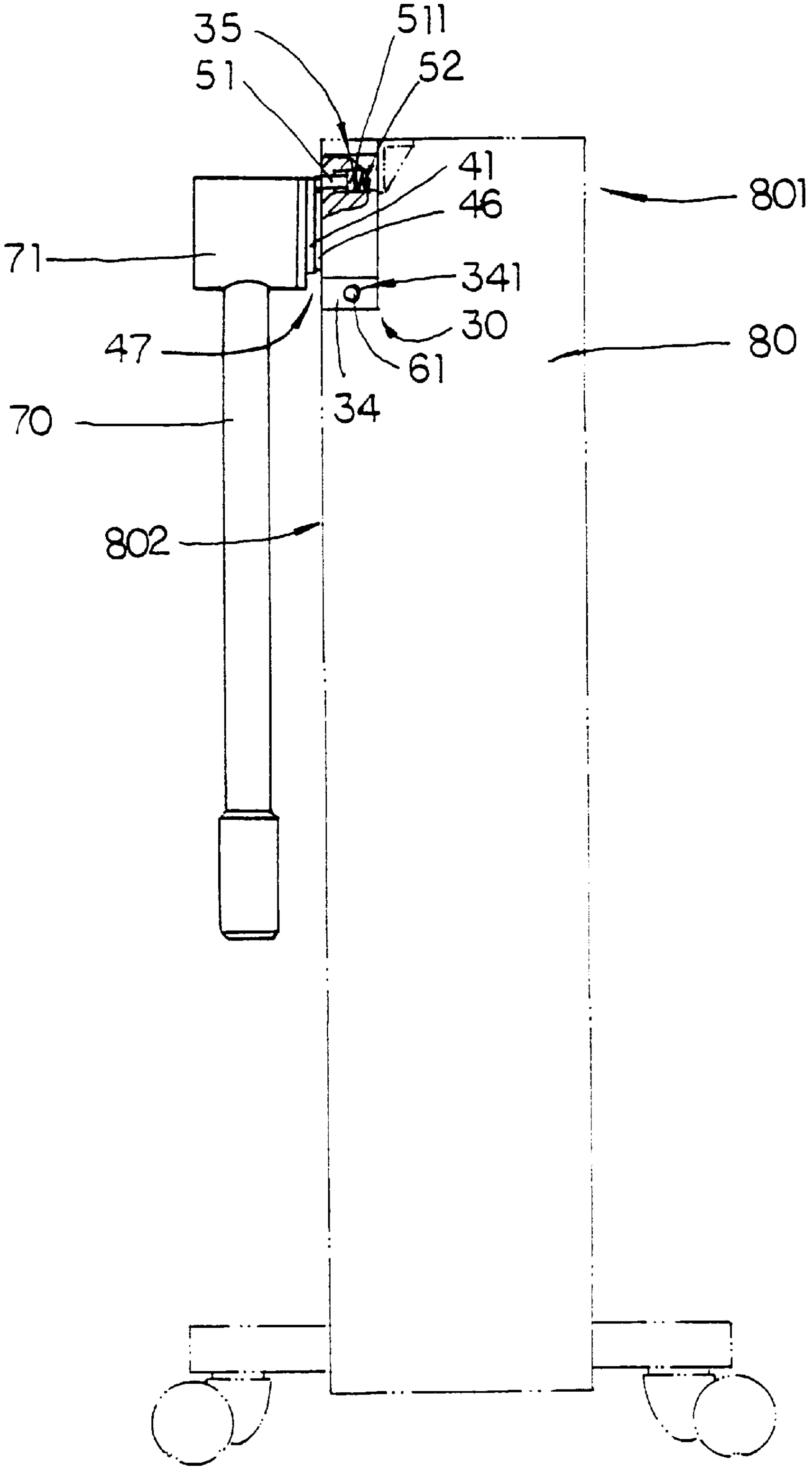
FIG. 4 is a schematic view of the rotation joint according to the above preferred embodiment, wherein the steamer arm is rotated to a hanging down position.

A holder 53 is secured to a rear end of the stopper hole 35 so as to hold the elastic element 52 and the blocking stud 51 inside the stopper hole 35. According to the present embodiment, the holder 53 is a screw securing though the rear end of the stopper hole 35. Therefore, as shown in FIG. 4, the blocking stud 51 is able to be pressed inwardly until its front end leaves the restricting groove 47 of the shoulder rim 42 of the head sleeve 41. Then, the blocking of the head sleeve 41 by the blocking stud 51 is released and the steamer arm 70 is free to rotate downwardly until it is hanged down, so that the size of the entire facial steamer is minimized to facilitate transportation and save storage space when it is not in use. When the facial steamer is required to use again, the user may simply upwardly rotate the steamer arm 70. The blocking stud 51 will automatically rebounded by the elastic element 52 to insert into the restricting groove 47 when the restricting groove 47 is rotated to the blocking stud 51 position.

The locking means 60 is adapted for pressing the two clamp fins 33, 34 toward each other in order to firmly clamp the head sleeve 41 in the mounting hole 32 of the clamping mount 30, so that the steamer arm 70 is locked in position to prevent any rotation movement.

As shown in FIG. 2, according to the present embodiment, each of the clamp fins 33, 34 has a coaxial locking hole 331, 341 provided thereon. The locking means 60 comprises a locking bolt 61 having a turning head 62 affixed at one end. The locking bolt 61 is rotatably mounted on a side wall of the facial steamer machine 80. The locking bolt 61 has a threaded shaft 63 which is extended to screw through the two locking holes 331, 341, so that by rotating the turning head 62, the two clamp fins 33, 34 will be pulled to move toward each other to clamp and fasten the head sleeve 41 in position. A nut 64 can be further screwed to a narrowed threaded end 631 of the locking bolt 61 to prevent the locking bolt 61 from unaccidently withdrawn from the two clamp fins 33, 34.

Accordingly, the user may turn the turning head 62 in opposite direction to loosen the clamping of the head sleeve 41, so that the steamer arm 70 is free to rotate in order to adjust the inclined position thereof After the steamer arm 70 is adjusted to a desired position, the user may then fastened the turning head 62 to firmly clamp the head sleeve 41 in position.

It is worth to mention that, according to the inventive concept disclosed above, it is an equivalent modification of the present invention to alternatively provide the stopper device 50, i.e. the blocking stud 51, on the shoulder rim 42 of the head sleeve 41 and form the arc-shape restricting groove 47 on the front side of the clamping mount 30. Alternatively, the clamping mount 30 can also be installed upside down with the two clamp fins 33, 34 positioning downwards, wherein the locking means 60 is adapted to install at a lower position. Such alternatives have the same effects and functions as the preferred embodiment described above. Thus, such modifications and the like should be consider within the protecting scope as claimed in the present invention.

In view of the above disclosure, the present invention can substantially achieve the following unexpected features and advantages:

1. The rotation joint 10 can limit the adjustable rotation angle of the steamer arm 70 to less than 180 degree, so that the steamer arm 70 is blocked to avoid positioning horizontally. In other words, in all situation during operation, the steamer arm 70 extends upwards to prevent any hot water from dropping down to the patient body.

2. The steamer arm 70 can be selectively to rotate to a left or a right position, so that it can be placed both in the right side and the left side of the operation bed so as to meet the requirement of either the right-handed user or the left-handed user and to fit the operation room of any size and arrangement.

3. The inclined angle of the steamer arm 70 can be firmly fastened in position by means of the locking means 60 to avoid unwanted movement after it is set during operation.

4. The presence of the sleeve 46 between the clamping mount 30 and the head sleeve 41 enables the user to adjust the tightness of the rotation of the steamer arm 70. When the locking bolt 61 is turned to push the two clamp fins 33, 34 together, the sleeve 46 will be pressed to reduce its diameter so as to more tightly hold the head sleeve 41, and then the rotation of the steamer arm 70 will be more tight.

5. The rotation joint 10 enables the steamer arm 70 to be adjusted to a hang down position so as to save the storage space when it is not in use.

6. The facial steamer installed with the rotation joint 10 of the present invention can be placed between two operation beds, wherein the user may selectively operate the steamer arm 70 to work on the left or right operation bed without moving the facial steamer.

What is claimed is:

1. A rotation joint, which is adapted for connecting a steamer arm to a facial steamer machine having a steam outlet, comprising:

a clamping mount, which is to be adapted to a back side of said facial steamer machine, having a mounting hole coaxially aligned with said steam outlet, wherein said mounting hole has an open slot and said clamping mount further comprises a pair of parallel clamp fins integrally extended from two sides of said open slot, wherein when said two clamp fins are pushed toward each other, a diameter of said mounting hole is reduced;

an arm head, for connection to a connecting end of said steamer arm, comprising a head sleeve having an outer diameter slightly smaller than said diameter of said mounting hole, wherein said head sleeve has an enlarged end forming a shoulder rim for affixing to said cylindrical connecting end of said steamer arm, and that said head sleeve is rotatably mounted inside said mounting hole of said clamping mount, wherein a steam supplying tube which is extended along said steamer arm to be connected to said steam outlet of said facial steamer machine, an arc-shape restricting groove being formed on an upper portion of said shoulder rim of said head sleeve, wherein an interior angle between two ends of said restricting groove is less than 180 degree;

a stopper device which comprises a blocking stud protruded from a front side of said clamping mount, wherein a front end of said blocking stud is extended in said restricting groove, so that said rotation of said steamer arm is limited by said blocking stud, that is said right rotation angle of said steamer arm is limited when said left end of said restricting groove is stopped by said blocking stud, and that said left rotation angle of said steamer arm is limited when said right end of said restricting groove is stopped by said blocking stud; and a locking means for pressing said two clamp fins toward each other in order to firmly clamp said head sleeve in said mounting hole of said clamping mount, so that said steamer arm is locked in position to prevent any rotation movement.

2. A rotation joint, as recited in claim 1, wherein said stopper device further comprises an elastic element, said blocking stud having an enlarged head, said clamping mount further having a stopper hole extended from a front side to a rear side of said clamping mount, in which a diameter of a front end of said stopper hole reduces to slightly larger than said blocking stud while a residual portion of said stopper hole has a diameter slightly larger than said enlarged head of said blocking stud, wherein said blocking stud is inserted inside said stopper hole and said elastic element is also inserted into said stopper hole to press against said blocking stud.

3. A rotation joint, as recited in claim 2, wherein said stopper device further comprises a holder secured to a rear end of said stopper hole so as to hold said elastic element and said blocking stud inside said stopper hole.

4. A rotation joint, as recited in claim 3, wherein said holder is a screw securing though said rear end of said stopper hole.

5. A rotation joint, as recited in claim 1, wherein said head sleeve has a length longer than a thickness of said clamp hole and a ring groove is provided near a free end of said head sleeve, wherein when said head sleeve is inserted through said mounting hole, a C-ring 44 is mounted on said ring groove so as to rotatably combine said head sleeve with said clamping mount, thereby said C-ring substantially locks said head sleeve in position and prevent said head sleeve from withdrawing from clamp mount.

6. A rotation joint, as recited in claim 5, wherein said head sleeve further comprises a washer ring mounted between said C-ring and a rear side of said clamping mount so as to ensure smooth contact therebetween.

7. A rotation joint, as recited in claim 3, wherein said head sleeve has a length longer than a thickness of said clamp hole and a ring groove is provided near a free end of said head sleeve, wherein when said head sleeve is inserted through said mounting hole, a C-ring 44 is mounted on said ring groove so as to rotatably combine said head sleeve with said clamping mount, thereby said C-ring substantially locks said head sleeve in position and prevent said head sleeve from withdrawing from the clamp mount.

8. A rotation joint, as recited in claim 7, wherein said head sleeve further comprises a washer ring mounted between said C-ring and a rear side of said clamping mount so as to ensure smooth contact therebetween.

9. A rotation joint, as recited in claim 1, wherein said head sleeve further comprises a sleeve mounted thereon, said sleeve living a longitudinal slot and positioning between said clamping mount and said head sleeve to ensure smooth rotation of said head sleeve with respect to said mounting hole by reducing friction therebetween.

10. A rotation joint, as recited in claim 6, wherein said head sleeve further comprises a sleeve mounted thereon, said sleeve having a longitudinal slot and positioning between said clamping mount and said head sleeve to ensure smooth rotation of said head sleeve with respect to said mounting hole by reducing friction therebetween.

11. A rotation joint, as recited in claim 8, wherein said head sleeve further comprises a sleeve mounted thereon, said sleeve having a longitudinal slot and positioning between said clamping mount and said head sleeve to ensure smooth rotation of said head sleeve with respect to said mounting hole by reducing friction therebetween.

12. A rotation joint, as recited in claim 1, wherein said restricting groove is a curved cut along said periphery of said shoulder rim.

13. A rotation joint, as recited in claim 9, wherein said restricting groove is a curved cut along said periphery of said shoulder rim.

14. A rotation joint, as recited in claim 10, wherein said restricting groove is a curved cut along said periphery of said shoulder rim.

15. A rotation joint, as recited in claim 1, wherein said restricting groove is a curved cut along said periphery of said shoulder rim.

16. A rotation joint, as recited in claim 1, wherein each of said clamp fins has a coaxial locking hole provided thereon, and said locking means comprises a locking bolt having a turning head affixed at one end, in which a threaded shaft of said locking bolt is extended to screw through said two locking holes for pushing said two clamp fins toward each other.

17. A rotation joint, as recited in claim 3, wherein each of said clamp fins has a coaxial locking hole provided thereon, and said locking means comprises a locking bolt having a turning head affixed at one end, in which a threaded shaft of said locking bolt is extended to screw through said two locking holes for pushing said two clamp fins toward each other.

18. A rotation joint, as recited in claim 8, wherein each of said clamp fins has a coaxial locking hole provided thereon, and said locking means comprises a locking bolt having a turning head affixed at one end, in which a threaded shaft of said locking bolt is extended to screw through said two locking holes for pushing said two clamp fins toward each other.

19. A rotation joint, as recited in claim 11, wherein each of said clamp fins has a coaxial locking hole provided thereon, and said locking means comprises a locking bolt having a turning head affixed at one end, in which a threaded shaft of said locking bolt is extended to screw through said two locking holes for pushing said two clamp fins toward each other.

20. A rotation joint, as recited in claim 15, wherein each of said clamp fins has a coaxial locking hole provided thereon, and said locking means comprises a locking bolt having a turning head affixed at one end, in which a threaded shaft of said locking bolt is extended to screw through said two locking holes for pushing said two clamp fins toward each other.

* * * * *